US008578183B2

(12) United States Patent
Yang

(10) Patent No.: US 8,578,183 B2
(45) Date of Patent: Nov. 5, 2013

(54) SERVER SYSTEM WITH DIRECT CURRENT TRANSFORMATION UNITS RECEIVING POWER ON SIGNAL AND GENERATING OPERATING VOLTAGE AND READY SIGNAL

(75) Inventor: Jun-Dong Yang, Shanghai (CN)

(73) Assignee: Inventec Corporation, Taipei (TW)

( * ) Notice: Subject to any disclaimer, the term of this patent is extended or adjusted under 35 U.S.C. 154(b) by 565 days.

(21) Appl. No.: 12/978,413

(22) Filed: Dec. 24, 2010

(65) Prior Publication Data

US 2012/0137153 A1 May 31, 2012

(30) Foreign Application Priority Data

Nov. 29, 2010 (TW) .............................. 99141267 A

(51) Int. Cl.
*G06F 1/26* (2006.01)
(52) U.S. Cl.
USPC ............................................ 713/300; 307/43
(58) Field of Classification Search
USPC ..................................... 713/300, 340; 307/43
See application file for complete search history.

(56) References Cited

U.S. PATENT DOCUMENTS

| 6,792,553 | B2 * | 9/2004 | Mar et al. ........................ 713/330 |
| 7,085,943 | B2 * | 8/2006 | Chun et al. ..................... 713/300 |
| 7,290,128 | B2 * | 10/2007 | Habib ................................ 713/2 |
| 7,863,774 | B2 * | 1/2011 | Chen ................................ 307/64 |
| 8,129,941 | B2 * | 3/2012 | Fan ................................ 320/107 |
| 2006/0082222 | A1 * | 4/2006 | Pincu et al. ....................... 307/29 |
| 2010/0007217 | A1 * | 1/2010 | Steele et al. ................... 307/131 |
| 2010/0115292 | A1 * | 5/2010 | Fan ................................ 713/300 |
| 2010/0235652 | A1 * | 9/2010 | Wilson et al. ................. 713/300 |
| 2011/0113263 | A1 * | 5/2011 | Bi et al. ......................... 713/300 |
| 2012/0042177 | A1 * | 2/2012 | Kong et al. ..................... 713/300 |

* cited by examiner

*Primary Examiner* — Chun Cao
(74) *Attorney, Agent, or Firm* — CKC & Partners Co., Ltd.

(57) ABSTRACT

A server system including a rack, motherboards and direct current (DC) transformation units is provided. Each of the motherboards is inserted on the rack, and generates a power on signal. Each of the DC transformation units is on the rack and receives a DC voltage. When each of the motherboards is electrically connect to the corresponding DC transformation unit, each of the DC transformation units generates a standby voltage and a standby voltage ready signal to the motherboard according to the DC voltage so that the motherboard enters a standby state according to the standby voltage ready signal. When the motherboard corresponding to each of the DC transformation unit generates the power on signal, the DC transformation unit receives the power on signal and generates an operating voltage and an operating voltage ready signal to the motherboard, and the motherboard is turned on according to the operating voltage ready signal.

13 Claims, 5 Drawing Sheets

SERVER SYSTEM WITH DIRECT CURRENT TRANSFORMATION UNITS RECEIVING POWER ON SIGNAL AND GENERATING OPERATING VOLTAGE AND READY SIGNAL

CROSS-REFERENCE TO RELATED APPLICATION

This application claims the priority benefit of Taiwan application serial no. 99141267, filed on Nov. 29, 2010. The entirety of the above-mentioned patent application is hereby incorporated by reference herein and made a part of this specification.

BACKGROUND

1. Field of the Invention

The invention relates to a server system. Particularly, the invention relates to a server system having a direct current transformation unit and a voltage protection display function.

2. Description of Related Art

Generally, a power supply is used to supply an operating voltage for a server system. The current power supply generally receives an alternating current (AC) voltage of 100V-230V first, and then a transformer inside the power supply transforms the AC voltage into a direct current (DC) voltage. Then, the power supply transforms the DC voltage into a voltage of 12V, 5V or 3V to serve as the operating voltage of the server system.

However, each independent server requires a power supply for supplying power. Therefore, when a plurality of independent servers is configured in the server system, a same number of the power supplies corresponding to a number of the independent servers are simultaneously used. Therefore, efficiency of the server system is reduced, and circuit cost of the server system is increased.

SUMMARY OF THE INVENTION

The invention is directed to a server system, in which a direct current (DC) transformation unit is used to replace a conventional power supply for supplying power, so as to reduce a circuit cost of the server system. Moreover, the DC transformation unit has an indicating lamp to indicate an operation state of the DC transformation unit.

The invention provides a server system adapted to receive a direct current (DC) voltage sent from an alternating current (AC) to DC transformer. The server system includes a rack, a plurality of motherboards and a plurality of DC transformation units. The motherboards are respectively inserted on the rack, and each of the motherboards generates a power on signal when the motherboard is turned on. The DC transformation units are respectively disposed on the rack, and each of the DC transformation units receives the DC voltage. When each of the motherboards is inserted on the rack and is electrically connect to the corresponding DC transformation unit, each of the DC transformation units generates a standby voltage and a standby voltage ready signal to the motherboard according to the DC voltage, so that the motherboard enters a standby state according to the standby voltage ready signal. When the motherboard corresponding to each of the DC transformation units generates the power on signal, the DC transformation unit receives the power on signal and generates an operating voltage and an operating voltage ready signal to the motherboard, so that the motherboard is turned on according to the operating voltage ready signal.

In an embodiment of the invention, when each of the motherboards is inserted on the rack and is electrically connect to the corresponding DC transformation unit, the motherboard sends a ready signal to the corresponding DC transformation unit.

In an embodiment of the invention, the DC transformation units respectively include a first protection circuit and a second protection circuit. The first protection circuit receives the standby voltage, and when the standby voltage is over voltage, the first protection circuit disables the standby voltage ready signal. The second protection circuit receives the operating voltage, and when the operating voltage is over voltage, the second protection circuit disables the operating voltage ready signal.

In an embodiment of the invention, the first protection circuit includes a first voltage detection unit, a first enable signal processing unit, a first latch unit, a first control unit and a first voltage transformation unit. The first voltage detection unit receives and detects the standby voltage to generate a standby voltage state signal, where the standby voltage state signal indicates a stable sate of the standby voltage. The first enable signal processing unit is coupled to the first voltage detection unit, and receives the standby voltage state signal and a first enable signal, and determines a state of the first enable signal according to the standby voltage state signal, where when the standby voltage is stable, the first enable signal is effective, and when the standby voltage is unstable, the first enable signal is ineffective. The first latch unit is coupled to the first enable signal processing unit, and when the first enable signal is ineffective, the first latch unit latches the first enable signal to keep an ineffective state. The first control unit receives the first enable signal to generate a control signal. When the first enable signal is effective, the control signal is effective, and when the first enable signal is ineffective, the control signal is ineffective. The first voltage transformation unit is coupled to the control unit, and when the control signal is effective, the voltage transformation unit receives the standby voltage and transforms the standby voltage into the standby voltage ready signal for outputting. When the control signal is ineffective, the voltage transformation unit stops receiving the standby voltage.

In an embodiment of the invention, the second protection circuit includes a second voltage detection unit, a second enable signal processing unit, a second latch unit, a second control unit and a second voltage transformation unit. The second voltage detection unit receives and detects the operating voltage to generate an operating voltage state signal, where the operating voltage state signal indicates a stable sate of the operating voltage. The second enable signal processing unit is coupled to the second voltage detection unit, and receives the operating voltage state signal and a second enable signal, and determines a state of the second enable signal according to the operating voltage state signal, where when the operating voltage is stable, the second enable signal is effective, and when the operating voltage is unstable, the second enable signal is ineffective. The second latch unit is coupled to the second enable signal processing unit, and when the second enable signal is ineffective, the second latch unit latches the second enable signal to keep an ineffective state. The second control unit receives the second enable signal to generate a control signal. When the second enable signal is effective, the control signal is effective, and when the second enable signal is ineffective, the control signal is ineffective. The second voltage transformation unit is coupled to the control unit, and when the control signal is effective, the voltage transformation unit receives the operating voltage and transforms the operating voltage into the operating voltage ready signal for outputting. When the control signal is ineffective, the voltage transformation unit stops receiving the operating voltage.

In an embodiment of the invention, the DC transformation units respectively include a voltage detection module and a display unit. The voltage detection module receives the power on signal, the standby voltage ready signal and the operating voltage ready signal to generate a detecting signal, where when the standby voltage ready signal and the operating voltage ready signal are all effective, or the power on signal and the standby voltage ready signal are all effective, the detecting signal is in a first state, and when the power on signal and the operating voltage ready signal are all ineffective, or the standby voltage ready signal is ineffective, the detecting signal is in a second state. The display unit is coupled to the voltage detection module for receiving and displaying the detecting signal.

In an embodiment of the invention, the voltage detection module includes a first inverter, an OR gate and an AND gate. An input terminal of the first inverter receives the power on signal, and an output terminal of the first inverter generates a first voltage signal. A first input terminal of the OR gate receives the operating voltage ready signal, a second input terminal of the OR gate is coupled to the output terminal of the first inverter, and an output terminal of the OR gate generates a second voltage signal. A first input terminal of the AND gate is coupled to the output terminal of the OR gate, a second input terminal of the AND gate receives the standby voltage ready signal, and an output terminal of the AND gate generates the detecting signal.

In an embodiment of the invention, the display unit includes a light emitting diode. An anode of the light emitting diode is coupled to the output terminal of the AND gate, and a cathode of the light emitting diode is coupled to ground.

In an embodiment of the invention, the voltage detection module further includes a second inverter. An input terminal of the second inverter is coupled to the output terminal of the AND gate, and an output terminal of the second inverter generates a third voltage signal.

In an embodiment of the invention, the display unit includes a first light emitting diode and a second light emitting diode. An anode of the first light emitting diode receives the detecting signal, and a cathode of the first light emitting receives the third voltage signal. An anode of the second light emitting diode is coupled to the cathode of the first light emitting diode, and a cathode of the second light emitting diode is coupled to the anode of the first light emitting diode.

In an embodiment of the invention, the DC transformation units respectively include a voltage current capturing unit. The voltage current capturing unit is connected to a baseboard management controller of the corresponding motherboard through a bus for receiving the DC voltage, so as to transmit related information of the DC voltage to the baseboard management controller of the corresponding motherboard.

In an embodiment of the invention, the DC transformation units respectively include a switching unit. The switching unit is coupled to the corresponding motherboard, and receives the standby voltage and the operating voltage, where when the corresponding motherboard is in the standby state, the switching unit outputs the standby voltage to the corresponding motherboard, and when the corresponding mother board is in a turned-on state, the switching unit outputs the operating voltage to the corresponding motherboard.

In an embodiment of the invention, the DC transformation units respectively include a DC buck unit. The DC buck unit receives the operating voltage, and transforms the operating voltage into a system operating voltage required by the corresponding motherboard.

According to the above descriptions, in the invention, the DC transformation units are used to replace the conventional power supply for supplying power, and all of the DC transformation units can share one AC to DC transformer, so that the circuit cost is reduced. Moreover, the first protection circuit, the second protection circuit and the voltage detection module of the DC transformation unit can be used to detect the standby voltage, the standby voltage ready signal, the operating voltage and the operating voltage ready signal, and display a detecting result on the display unit. In this way, a user can quickly know whether the standby voltage and the operating voltage are in an unstable state (for example, an over current state, an over voltage state or an under voltage state), so as to carry on maintenance.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
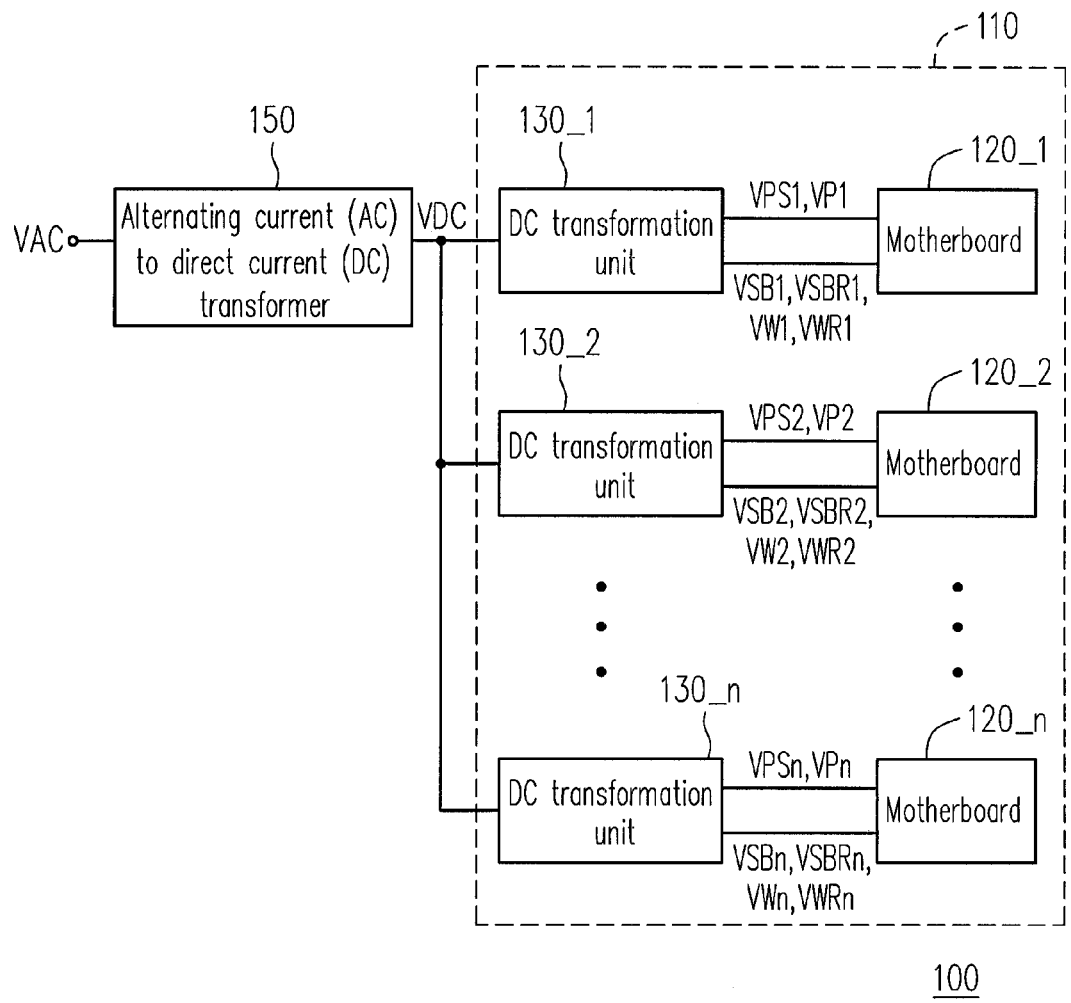
FIG. 1 is a block diagram of a server system according to an embodiment of the invention.

FIG. 1 is a block diagram of a server system according to an embodiment of the invention. The server system 100 of the present embodiment is adapted to receive a direct current (DC) voltage VDC sent by an alternating current (AC) to DC transformer 150, where the AC to DC transformer 150, for example, receives an AC voltage VAC (for example, 100V-230V), and transforms the AC voltage VAC to generate the DC voltage VDC (for example, 12V). Referring to FIG. 1, the server system 100 includes a rack 110, a plurality of motherboards 120_1-120_n and a plurality of DC transformation units 130_1-130_n, where n is a positive integer greater than 1.

The motherboards 120_1-120_n are respectively inserted on the rack 110, and generate power on signals VPS1-VPSn when the motherboards 120_1-120_n are turned on, so as to indicate whether the motherboards 120_1-120_n are in operation. The DC transformation units 130_1-130_n are respectively disposed on the rack 110, and each of the DC transformation units 130_1-130_n receives the DC voltage VDC.

When each of the motherboards 120_1-120n is inserted on the rack 110 and is electrically connect to the corresponding DC transformation unit, the DC transformation unit generates a standby voltage and a standby voltage ready signal to the motherboard according to the DC voltage VDC, so that the motherboard enters a standby state according to the standby voltage ready signal. For example, when the motherboard 120_1 is electrically connected to the corresponding DC transformation unit 130_1, the DC transformation unit 130_1 generates a standby voltage VSB1 and a standby voltage ready signal VSBR1 to the motherboard 120_1 according to the received DC voltage VDC, so that the motherboard 120_1 enters the standby state according to the standby voltage ready signal VSBR1.

Moreover, in the present embodiment, when each of the motherboards is inserted on the rack 110 and is electrically connect to the corresponding DC transformation unit, the motherboard sends a ready signal VP to the corresponding DC transformation unit. For example, when the motherboard 120_1 is inserted on the rack 110 and is electrically connected to the corresponding DC transformation unit 130_1, the motherboard 120_1 sends a ready signal VP1 to the corresponding DC transformation unit 130_1, which represents that the motherboard 120_1 has been electrically connected to the DC transformation unit 130_1.

Moreover, when the motherboard corresponding to each of the DC transformation units generates the power on signal, the DC transformation unit receives the power on signal and generates an operating voltage and an operating voltage ready signal to the motherboard, so that the motherboard is turned on according to the operating voltage ready signal. For example, when the motherboard 120_1 corresponding to the DC transformation unit 130_1 generates the power on signal VPS1, the DC transformation unit 130_1 receives the power on signal VPS1 and generates an operating voltage VW1 and an operating voltage ready signal VWR1 to the motherboard 120_1, so that the motherboard 120_1 is turned on according to the operating voltage ready signal VWR1, so as to normally operate. In this way, the server system 100 of the present embodiment does not require a conventional power supply for supplying power.

For simplicity's sake, the motherboard 120_1 and the DC transformation unit 130_1 are taken as an example for description, and implementations of other motherboards 120_2-120_n and the DC transformation units 130_2-130_n can be as that of the motherboard 120_1 and the DC transformation unit 130_1, which are not repeated.

Figure 2:
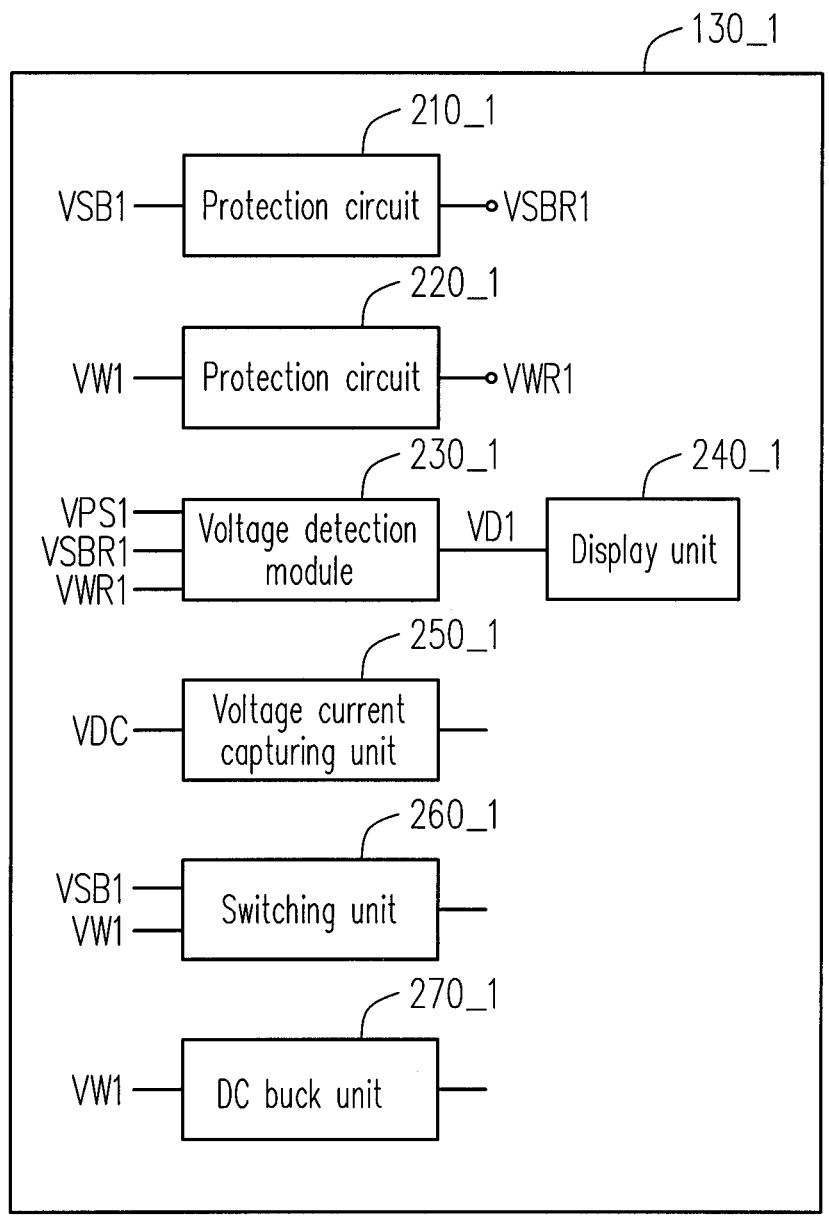
FIG. 2 is an internal circuit block diagram of a direct current (DC) transformation unit 130_1.

FIG. 2 is an internal circuit block diagram of the DC transformation unit 130_1. Referring to FIG. 2, the DC transformation unit 130_1 includes protection circuits 210_1 and 220_1, a voltage detection module 230_1, a display unit 240_1, a voltage current capturing unit 250_1, a switching unit 260_1 and a DC buck unit 270_1.

The protection circuit 210_1 receives the standby voltage VSB1, and when the standby voltage VSB1 is over voltage, the protection circuit 210_1 disables the standby voltage ready signal VSBR1, so that the motherboard 120_1 in the standby state is turned off, so as to avoid damaging the motherboard 120_1.

The protection circuit 220_1 receives the operating voltage VW1, and when the operating voltage VW1 is over voltage, the protection circuit 220_1 disables the operating voltage ready signal VWR1, so that the motherboard 120_1 in a working state is turned off, so as to avoid damaging the motherboard 120_1.

The voltage detection module 230_1 receives the power on signal VPS1, the standby voltage ready signal VSBR1 and the operating voltage ready signal VWR1 to generate a detecting signal DS1, where when the standby voltage ready signal VSBR1 and the operating voltage ready signal VWR1 are all effective, or the power on signal VPS1 and the standby voltage ready signal VSBR1 are all effective, the detecting signal DS1 is in a first state, and when the power on signal VPS1 and the operating voltage ready signal VWR1 are all ineffective, or the standby voltage ready signal VSBR1 is ineffective, the detecting signal DS1 is in a second state.

The voltage current capturing unit 250_1 is connected to a baseboard management controller (not shown) of the corresponding motherboard (i.e. the motherboard 120_1) through a bus (for example, an IIC bus), and receives the DC voltage VDC to transmit related information of the DC voltage VDC to the baseboard management controller of the corresponding motherboard (i.e. the motherboard 120_1).

The switching unit 260_1 is coupled to the corresponding motherboard (i.e. the motherboard 120_1), and receives the standby voltage VSB1 and the operating voltage VW1, where when the corresponding motherboard (i.e. the motherboard 120_1) is in the standby state, the switching unit 260_1 outputs the standby voltage VSB1 to the corresponding motherboard (i.e. the motherboard 120_1), and when the corresponding mother board (i.e. the motherboard 120_1) is in a turned-on state, the switching unit outputs the operating voltage VW1 to the corresponding motherboard (i.e. the motherboard 120_1).

The DC buck unit 270_1 receives the operating voltage VW1, and transforms the operating voltage VW1 into a system operating voltage (for example, 5V, 3V, etc.) required by the corresponding motherboard (i.e. the motherboard 120_1).

Therefore, the DC transformation unit 130_1 of the present embodiment can effectively replace the conventional power supply, and has the power protection function. The protection circuits 210_1 and 220_1, the voltage detection module 230_1 and the display unit 240_1 of the DC transformation unit 130_1 are described in detail below.

Figure 3:
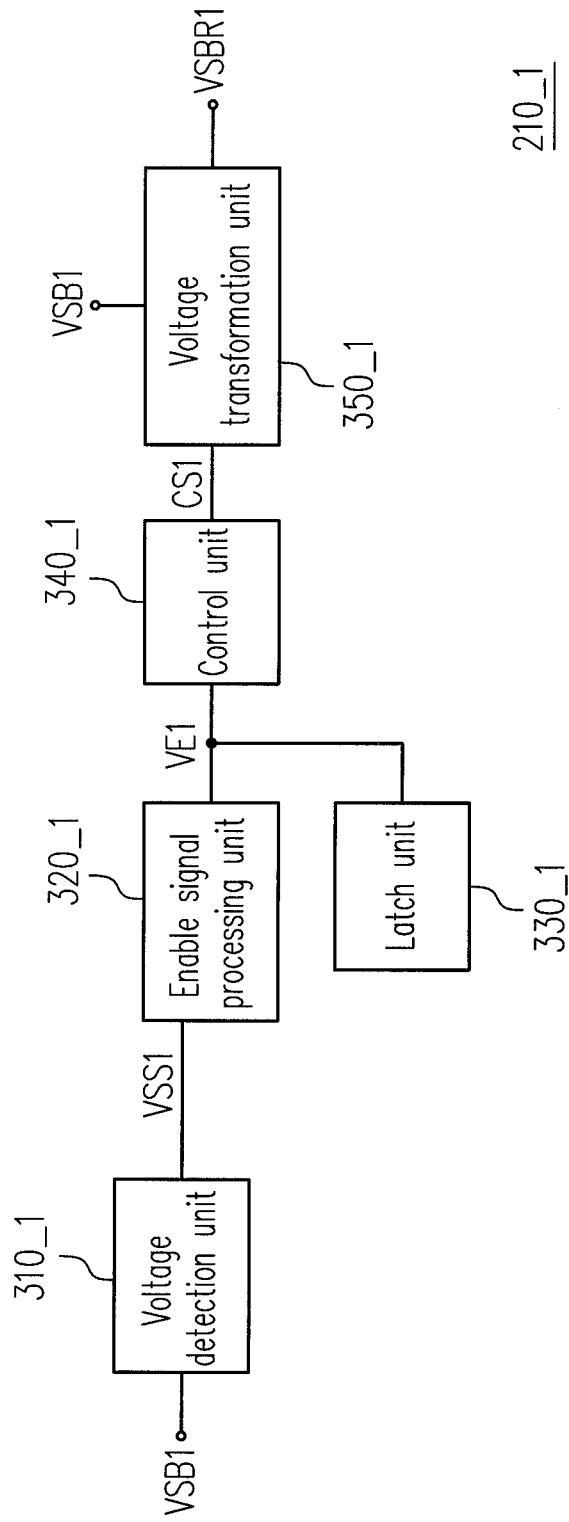
FIG. 3 is a block diagram of a protection circuit 210_1 of FIG. 2.

FIG. 3 is a block diagram of the protection circuit 210_1 of FIG. 2. Referring to FIG. 3, the protection circuit 210_1 includes a voltage detection unit 310_1, an enable signal processing unit 320_1, a latch unit 330_1, a control unit 340_1 and a voltage transformation unit 350_1.

The voltage detection unit 310_1 receives and detects the standby voltage VSB1 to generate a standby voltage state signal VSS1, where the standby voltage state signal VSS1 indicates a stable sate of the standby voltage VSB1. The enable signal processing unit 320_1 is coupled to the voltage detection unit 310_1, and receives the standby voltage state signal VSS1 and an enable signal VE1, and determines a state of the enable signal VE1 according to the standby voltage state signal VSS1, where when the standby voltage VSB1 is stable, the enable signal VE1 is effective, and when the standby voltage VSB1 is unstable, the enable signal VE1 is ineffective.

The latch unit 330_1 is coupled to the enable signal processing unit 320_1, and when the enable signal VE1 is ineffective, the latch unit 330_1 latches the enable signal VE1 to keep an ineffective state. The control unit 340_1 receives the enable signal VE1 to generate a control signal CS1. When the enable signal VE1 is effective, the control signal CS1 is effective, and when the enable signal VE1 is ineffective, the control signal CS1 is ineffective. The voltage transformation unit 350_1 is coupled to the control unit 340_1, and when the control signal CS1 is effective, the voltage transformation unit 350_1 receives the standby voltage VSB1 and transforms the standby voltage VSB1 into the standby voltage ready signal VSBR1 for outputting. When the control signal CS1 is ineffective, the voltage transformation unit 350_1 stops receiving the standby voltage VSB1. In this way, the DC transformation unit 130_1 can detect the state of the standby voltage VSB1 through the protection circuit 210_1, so that when the standby voltage VSB1 is in an over current state, an over voltage state or an under voltage state, the DC transformation unit 130_1 can effectively cut off the standby voltage VSB1 supplied to the motherboard 120_1, so as to protect the motherboard 120_1 from damage.

Figure 4:
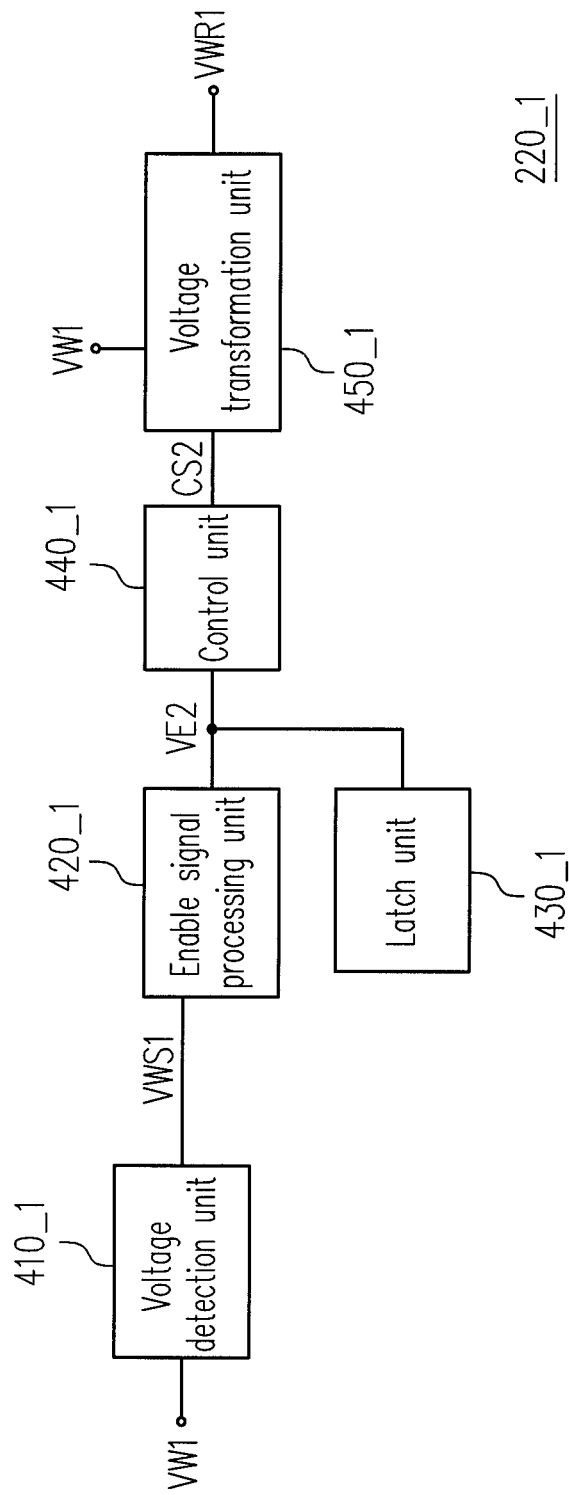
FIG. 4 is a block diagram of a protection circuit 220_1 of FIG. 2.

FIG. 4 is a block diagram of the protection circuit 220_1 of FIG. 2. Referring to FIG. 4, the protection circuit 220_1 includes a voltage detection unit 410_1, an enable signal processing unit 420_1, a latch unit 430_1, a control unit 440_1 and a voltage transformation unit 450_1.

The voltage detection unit 410_1 receives and detects the operating voltage VW1 to generate an operating voltage state signal VWS1, where the operating voltage state signal VWS1 indicates a stable sate of the operating voltage VW1. The enable signal processing unit 420_1 is coupled to the voltage detection unit 410_1, and receives the operating voltage state signal VWS1 and an enable signal VE2, and determines a state of the enable signal VE2 according to the operating voltage state signal VWS1, where when the operating voltage VW1 is stable, the enable signal VE2 is effective, and when the operating voltage VW1 is unstable, the enable signal VE2 is ineffective.

The latch unit 430_1 is coupled to the enable signal processing unit 420_1, and when the enable signal VE2 is ineffective, the latch unit 430_1 latches the enable signal VE2 to keep an ineffective state. The control unit 440_1 receives the enable signal VE2 to generate a control signal CS2. When the enable signal VE2 is effective, the control signal CS2 is effective, and when the enable signal VE2 is ineffective, the control signal CS2 is ineffective. The voltage transformation unit 450_1 is coupled to the control unit 440_1, and when the control signal CS2 is effective, the voltage transformation unit 450_1 receives the operating voltage VW1 and transforms the operating voltage VW1 into the operating voltage ready signal VWR1 for outputting. When the control signal CS2 is ineffective, the voltage transformation unit 450_1 stops receiving the operating voltage VW1. In this way, the DC transformation unit 130_1 can detect the state of the operating voltage VW1 through the protection circuit 220_1, so that when the operating voltage VW1 is in an over current state, an over voltage state or an under voltage state, the DC transformation unit 130_1 can effectively cut off the operating voltage VW1 supplied to the motherboard 120_1, so as to protect the motherboard 120_1 from damage.

Figure 5:
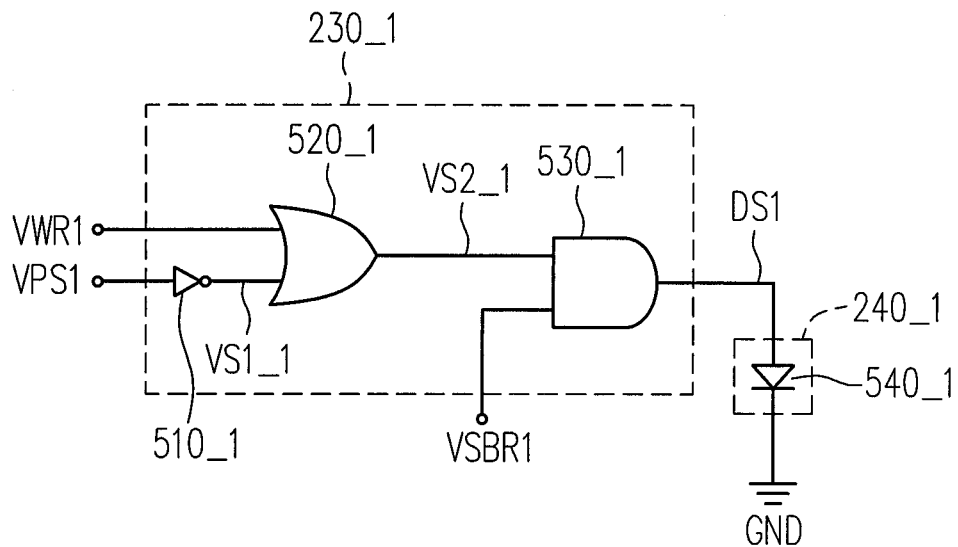
FIG. 5 is a detailed circuit diagram of a voltage detection module 230_1 and a display unit 240_1 of FIG. 2.

FIG. 5 is a detailed circuit diagram of the voltage detection module 230_1 and the display unit 240_1 of FIG. 2. Referring to FIG. 5, the voltage detection module 230_1 includes an inverter 510_1, an OR gate 520_1 and an AND gate 530_1. An input terminal of the inverter 510_1 receives the power on signal VPS1, and an output terminal of the inverter 510_1 generates a voltage signal VS1_1. A first input terminal of the OR gate 520_1 receives the operating voltage ready signal VWR1, a second input terminal of the OR gate 520_1 is coupled to the output terminal of the inverter 510_1, and an output terminal of the OR gate 520_1 generates a voltage signal VS2_1. A first input terminal of the AND gate 530_1 is coupled to the output terminal of the OR gate 520_1, a second input terminal of the AND gate 530_1 receives the standby voltage ready signal VSBR1, and an output terminal of the AND gate 530_1 generates a detecting signal DS1. Moreover, the display unit 240_1 includes a light emitting diode (LED) 540_1. An anode of the LED 540_1 is coupled to the output terminal of the AND gate 530_1, and a cathode of the LED 540_1 is coupled to ground GND.

Table one is a truth value table of the operating voltage ready signal VWR1, the voltage signal VS1_1, the standby voltage ready signal VSBR1 and the detecting signal DS1.

| VWR1 | VS1_1 | VSBR1 | DS1 |
|------|-------|-------|-----|
| 0 | 1 | 0 | 0 |
| 0 | 1 | 1 | 1 |
| 0 | 0 | 0 | 0 |
| 0 | 0 | 1 | 0 |
| 1 | 0 | 0 | 0 |
| 1 | 0 | 1 | 1 |

Table one is the truth value table of the operating voltage ready signal VWR1, the voltage signal VS1_1, the standby voltage ready signal VSBR1 and the detecting signal DS1. Operations of the voltage detection module 230_1 and the display unit 240_1 are described below with reference of the table one.

Referring to the table one and FIG. 5, first, when the power on signal VPS1 has a low logic level "0", it represents that the motherboard 120_1 does not operate. Since the motherboard 120_1 does not operate, the DC transformation unit 130_1 transforms the operating voltage ready signal VWR1 into the low logic level "0". Then, the inverter 510_1 receives the power on signal VPS1 with the low logic level "0", and inverts the power on signal VPS1 to generate the voltage signal VS1_1 with a high logic level "1" to the second input terminal of the OR gate 520_1.

The OR gate 520_1 operates the operating voltage ready signal VWR1 with the low logic level "0" and the voltage signal VS1_1 with the high logic level "1", and generates the voltage signal VS2_1 with the high logic level "1" to the first input terminal of the AND gate 530_1. Now, since the motherboard 120_1 has been electrically connected to the DC transformation unit 130_1, the DC transformation unit 130_1 generates the standby voltage ready signal VSBR1 with the high logic level "1" to the second input terminal of the AND gate 530_1. Then, the output terminal of the AND gate 530_1 generates the detecting signal DS1 with the high logic level "1" to the anode of the LED 540_1, so that the LED 540_1 emits light, which represents that the standby voltage ready signal VSBR1 is in a normal state (i.e. the standby voltage VSB1 is in the normal state).

On the other hand, if the standby voltage VSB1 is in the unstable state, the DC transformation unit 130_1 generates the standby voltage ready signal VSBR1 with the low logic level "0" to the second input terminal of the AND gate 530_1. Then, the output terminal of the AND gate 530_1 generates the detecting signal DS1 with the low logic level "0" to the anode of the LED 540_1, so that the LED 540_1 does not emit light, which represents that the standby voltage ready signal VSBR1 is in an abnormal state (i.e. the standby voltage VSB1 is in the abnormal state).

Moreover, when the power on signal VPS1 is transited to the high logic level "1", it represents that the motherboard 120_1 is to be turned on. Then, the inverter 510_1 inverts the power on signal VPS1 with the high logic level "1" to generate the voltage signal VS1_1 with the low logic level "0" to the second input terminal of the OR gate 520_1. Meanwhile, if the operating voltage VW1 is in the normal state, the DC transformation unit 130_1 provides the operating voltage ready signal VWR1 with the high logic level "1" to the first input terminal of the OR gate 520_1.

Then, the OR gate 520_1 operates the voltage signal VS1_1 with the low logic level "0" and the operating voltage ready signal VWR1 with the high logic level "1", and generates the voltage signal VS2_1 with the high logic level "1" to the first input terminal of the AND gate 530_1. Then, the AND gate 530_1 determines a logic level of the detecting signal DS1 generated at the output terminal of the AND gate 530_1 according to the standby voltage ready signal VSBR1. Namely, if the standby voltage ready signal VSBR1 has the high logic level "1", the output terminal of the AND gate 530_1 generates the detecting signal DS1 with the high logic level "1", so that the LED 540_1 emits light, which represents that the standby voltage VSB1 and the operating voltage VW1 are in the normal state. Comparatively, if the standby voltage ready signal VSBR1 has the low logic level "0", the output terminal of the AND gate 530_1 generates the detecting signal DS1 with the low logic level "0", so that the LED 540_1 does not emit light, which represents that the standby voltage VSB1 is in the abnormal state.

On the other hand, if the operating voltage VW1 is in the unstable state, the DC transformation unit 130_1 provides the operating voltage ready signal VWR1 with the low logic level "0" to the first input terminal of the OR gate 520_1. Then, the OR gate 520_1 operates the voltage signal VS1_1 with the low logic level "0" and the operating voltage ready signal VWR1 with the low logic level "0", and generates the voltage signal VS2_1 with the high logic level "1" to the first input terminal of the AND gate 530_1. Now, regardless whether the standby voltage ready signal VSBR1 has the high logic level "1" or the low logic level "0", the output terminal of the AND gate 530_1 generates the detecting signal DS1 with the low logic level "0", so that the LED 540_1 does not emit light, which represents that the operating voltage VW1 is in the abnormal state.

In this way, a user can know whether the standby voltage VSB1 and the operating voltage VW1 are in the stable state according to a light-emitting state of the LED 540_1.

Figure 6:
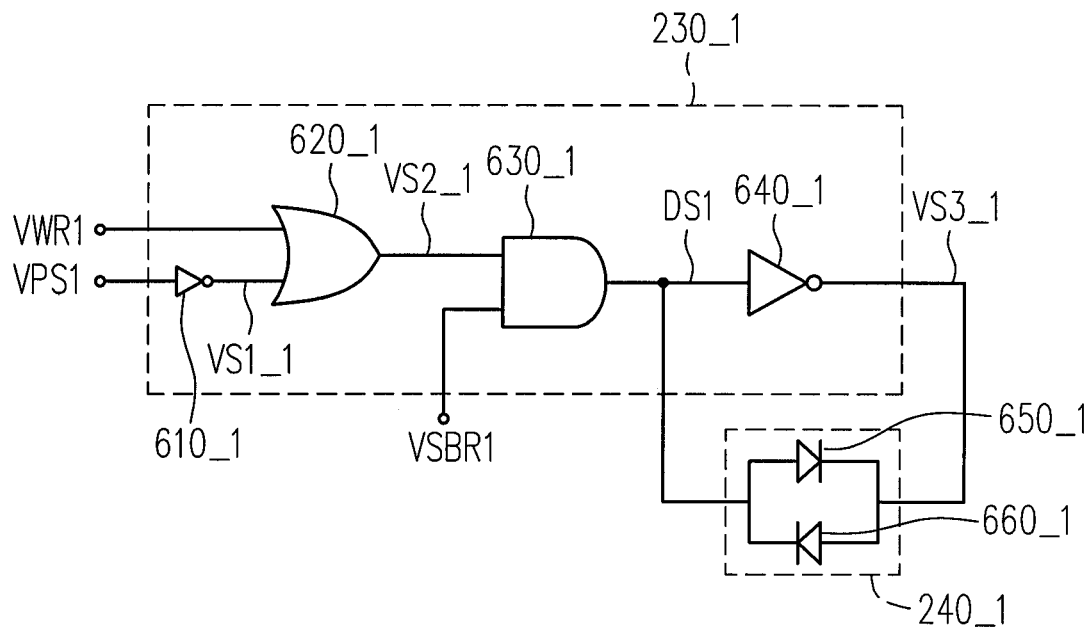
FIG. 6 is another detailed circuit diagram of the voltage detection module 230_1 and the display unit 240_1 of FIG. 2.

The above implantation of the voltage detection module 230_1 and the display unit 240_1 of FIG. 5 are only an example of the invention, and another example thereof is provided below for description. FIG. 6 is another detailed circuit diagram of the voltage detection module 230_1 and the display unit 240_1 of FIG. 2. Referring to FIG. 6, the voltage detection module 230_1 includes an inverter 610_1, an OR gate 620_1, an AND gate 630_1 and an inverter 640_1. An input terminal of the inverter 610_1 receives the power on signal VPS1, and an output terminal of the inverter 610_1 generates the voltage signal VS1_1.

A first input terminal of the OR gate 620_1 receives the operating voltage ready signal VWR1, a second input terminal of the OR gate 620_1 is coupled to the output terminal of the inverter 610_1, and an output terminal of the OR gate 620_1 generates the voltage signal VS2_1. A first input terminal of the AND gate 630_1 is coupled to the output terminal of the OR gate 620_1, a second input terminal of the AND gate 630_1 receives the standby voltage ready signal VSBR1, and an output terminal of the AND gate 630_1 generates the detecting signal DS1. An input terminal of the inverter 640_1 is coupled to the output terminal of the AND gate 630_1, and an output terminal of the inverter 640_1 generates a voltage signal VS3_1. Moreover, the display unit 240_1 includes LEDs 650_1 and 660_1. An anode of the LED 650_1 receives the detecting signal DS1, and a cathode of the LED 650_1 receives the voltage signal VS3_1. An anode of the LED 660_1 is coupled to the cathode of the LED 650_1, and a cathode of the LED 660_1 is coupled to the anode of the LED 650_1.

Operations of the voltage detection module 230_1 and the display unit 240_1 are described below with reference of the table one. Referring to the table one and FIG. 6, first, when the power on signal VPS1 has the low logic level "0", it represents that the motherboard 120_1 does not operate. Since the motherboard 120_1 does not operate, the DC transformation unit 130_1 transforms the operating voltage ready signal VWR1 into the low logic level "0". Then, the inverter 610_1 receives the power on signal VPS1 with the low logic level "0", and inverts the power on signal VPS1 to generate the voltage signal VS1_1 with the high logic level "1" to the second input terminal of the OR gate 620_1.

The OR gate 620_1 operates the operating voltage ready signal VWR1 with the low logic level "0" and the voltage signal VS1_1 with the high logic level "1", and generates the voltage signal VS2_1 with the high logic level "1" to the first input terminal of the AND gate 630_1. Now, since the motherboard 120_1 has been electrically connected to the DC transformation unit 130_1, the DC transformation unit 130_1 generates the standby voltage ready signal VSBR1 with the high logic level "1" to the second input terminal of the AND gate 630_1. Then, the output terminal of the AND gate 630_1 generates the detecting signal DS1 with the high logic level "1" to the input terminal of the inverter 640_1. Then, the inverter 640_1 inverts the detecting signal DS1 with the high logic level "1" to generate the voltage signal VS3_1 with the low logic level "0". Since the detecting signal DS1 has the high logic level "1" and the voltage signal VS3_1 has the low logic level "0", the LED 650_1 emits light, and the LED 660_1 does not emit light, which represents that the standby voltage ready signal VSBR1 is in the normal state (i.e. the standby voltage VSB1 is in the normal state).

On the other hand, if the standby voltage VSB1 is in the unstable state, the DC transformation unit 130 generates the standby voltage ready signal VSBR1 with the low logic level "0" to the second input terminal of the AND gate 630_1. Then, the output terminal of the AND gate 630_1 generates the detecting signal DS1 with the low logic level "0" to the input terminal of the inverter 640_1. Then, the inverter 640_1 inverts the detecting signal DS1 with the low logic level "0" to generate the voltage signal VS3_1 with the high logic level "1". Since the detecting signal DS1 has the low logic level "0" and the voltage signal VS3_1 has the high logic level "1", the LED 650_1 does not emit light, and the LED 660_1 emits light, which represents that the standby voltage ready signal VSBR1 is in the abnormal state (i.e. the standby voltage VSB1 is in the abnormal state).

Moreover, when the power on signal VPS1 is transited to the high logic level "1", it represents that the motherboard 120_1 is to be turned on. Then, the inverter 610_1 inverts the power on signal VPS1 with the high logic level "1" to generate the voltage signal VS1_1 with the low logic level "0" to the second input terminal of the OR gate 620_1. Meanwhile, if the operating voltage VW1 is in the normal state, the DC transformation unit 130_1 provides the operating voltage ready signal VWR1 with the high logic level "1" to the first input terminal of the OR gate 620_1.

Then, the OR gate 620_1 operates the voltage signal VS1_1 with the low logic level "0" and the operating voltage ready signal VWR1 with the high logic level "1", and generates the voltage signal VS2_1 with the high logic level "1" to the first input terminal of the AND gate 630_1. Then, the AND gate 630_1 determines a logic level of the detecting signal DS1 generated at the output terminal of the AND gate 630_1 according to the standby voltage ready signal VSBR1. Namely, if the standby voltage ready signal VSBR1 has the high logic level "1", the output terminal of the AND gate 630_1 generates the detecting signal DS1 with the high logic level "1" to the input terminal of the inverter 640_1. Then, the inverter 640_1 inverts the detecting signal DS1 with the high logic level "1" to generate the voltage signal VS3_1 with the low logic level "0". Since the detecting signal DS1 has the high logic level "1" and the voltage signal VS3_1 has the low logic level "0", the LED 650_1 emits light, and the LED 660_1 does not emit light, which represents that the standby voltage VSB1 and the operating voltage VW1 are in the normal state.

Comparatively, if the standby voltage ready signal VSBR1 has the low logic level "0", the output terminal of the AND gate 630_1 generates the detecting signal DS1 with the low logic level "0" to the input terminal of the inverter 640_1. Then, the inverter 640_1 inverts the detecting signal DS1 with the low logic level "0" to generate the voltage signal VS3_1 with the high logic level "1". Since the detecting signal DS1 has the low logic level "0" and the voltage signal VS3_1 has the high logic level "1", the LED 650_1 does not emit light, and the LED 660_1 emits light, which represents that the standby voltage VSB1 is in the abnormal state.

On the other hand, if the operating voltage VW1 is in the unstable state, the DC transformation unit 130_1 provides the operating voltage ready signal VWR1 with the low logic level "0" to the first input terminal of the OR gate 620_1. Then, the OR gate 620_1 operates the voltage signal VS1_1 with the low logic level "0" and the operating voltage ready signal VWR1 with the low logic level "0", and generates the voltage signal VS2_1 with the high logic level "1" to the first input terminal of the AND gate 630_1. Now, regardless whether the standby voltage ready signal VSBR1 has the high logic level "1" or the low logic level "0", the output terminal of the AND gate 630_1 generates the detecting signal DS1 with the low logic level "0". Then, the inverter 640_1 inverts the detecting signal DS1 with the low logic level "0" to generate the voltage signal VS3_1 with the high logic level "1". Since the detecting signal DS1 has the low logic level "0" and the voltage signal VS3_1 has the high logic level "1", the LED 650_1 does not emit light, and the LED 660_1 emits light, which represents that the operating voltage VW1 is in the abnormal state.

In this way, a user can know whether the standby voltage VSB1 and the operating voltage VW1 are in the stable state according to light-emitting states (lighted or not) of the LEDs 650_1 and 660_1

In summary, in the invention, the DC transformation units are used to replace the conventional power supply for supplying power, and all of the DC transformation units can share one AC to DC transformer, so that the circuit cost is reduced. Moreover, the first protection circuit, the second protection circuit and the voltage detection module of the DC transformation unit can be used to detect the standby voltage, the standby voltage ready signal, the operating voltage and the operating voltage ready signal, and display a detecting result on the display unit. In this way, the user can quickly know whether the standby voltage and the operating voltage are in the unstable state (for example, an over current state, an over voltage state or an under voltage state), so as to carry on maintenance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A server system, adapted to receive a direct current (DC) voltage sent from an alternating current (AC) to DC transformer, the server system comprising:
   a rack;
   a plurality of motherboards, respectively inserted on the rack, and each of the motherboards generating a power on signal when the motherboard is turned on; and
   a plurality of DC transformation units, respectively disposed on the rack, and each of the DC transformation units receiving the DC voltage,
   wherein when each of the motherboards is inserted on the rack and is electrically connect to the corresponding DC transformation unit, each of the DC transformation units generates a standby voltage and a standby voltage ready signal to the motherboard according to the DC voltage, so that the motherboard enters a standby state according to the standby voltage ready signal,
   when the motherboard corresponding to each of the DC transformation units generates the power on signal, the DC transformation unit receives the power on signal and generates an operating voltage and an operating voltage ready signal to the motherboard, so that the motherboard is turned on according to the operating voltage ready signal.

2. The server system as claimed in claim 1, wherein when each of the motherboards is inserted on the rack and is electrically connect to the corresponding DC transformation unit, the motherboard sends a ready signal to the corresponding DC transformation unit.

3. The server system as claimed in claim 1, wherein the DC transformation units respectively comprise:
   a first protection circuit, for receiving the standby voltage, wherein when the standby voltage is over voltage, the first protection circuit disables the standby voltage ready signal; and
   a second protection circuit, for receiving the operating voltage, wherein when the operating voltage is over voltage, the second protection circuit disables the operating voltage ready signal.

4. The server system as claimed in claim 3, wherein the first protection circuit comprises:
   a first voltage detection unit, for receiving and detecting the standby voltage to generate a standby voltage state signal, wherein the standby voltage state signal indicates a stable sate of the standby voltage;
   a first enable signal processing unit, coupled to the first voltage detection unit, for receiving the standby voltage state signal and a first enable signal, and determining a state of the first enable signal according to the standby voltage state signal, wherein when the standby voltage is stable, the first enable signal is effective, and when the standby voltage is unstable, the first enable signal is ineffective;
   a first latch unit, coupled to the first enable signal processing unit, wherein when the first enable signal is ineffective, the first latch unit latches the first enable signal to keep an ineffective state;
   a first control unit, for receiving the first enable signal to generate a control signal, wherein when the first enable signal is effective, the control signal is effective, and when the first enable signal is ineffective, the control signal is ineffective; and
   a first voltage transformation unit, coupled to the control unit, wherein when the control signal is effective, the voltage transformation unit receives the standby voltage and transforms the standby voltage into the standby voltage ready signal for outputting, and when the control signal is ineffective, the voltage transformation unit stops receiving the standby voltage.

5. The server system as claimed in claim 3, wherein the second protection circuit comprises:
   a second voltage detection unit, for receiving and detecting the operating voltage to generate an operating voltage state signal, wherein the operating voltage state signal indicates a stable sate of the operating voltage;
   a second enable signal processing unit, coupled to the second voltage detection unit, for receiving the operating voltage state signal and a second enable signal, and determining a state of the second enable signal according to the operating voltage state signal, wherein when the operating voltage is stable, the second enable signal is effective, and when the operating voltage is unstable, the second enable signal is ineffective;
   a second latch unit, coupled to the second enable signal processing unit, wherein when the second enable signal is ineffective, the second latch unit latches the second enable signal to keep an ineffective state;
   a second control unit, for receiving the second enable signal to generate a control signal, wherein when the second enable signal is effective, the control signal is effective, and when the second enable signal is ineffective, the control signal is ineffective; and
   a second voltage transformation unit, coupled to the control unit, wherein when the control signal is effective, the voltage transformation unit receives the operating voltage and transforms the operating voltage into the operating voltage ready signal for outputting, and when the control signal is ineffective, the voltage transformation unit stops receiving the operating voltage.

6. The server system as claimed in claim 1, wherein the DC transformation units respectively comprise:
   a voltage detection module, for receiving the power on signal, the standby voltage ready signal and the operating voltage ready signal to generate a detecting signal, wherein when the standby voltage ready signal and the operating voltage ready signal are all effective, or the power on signal and the standby voltage ready signal are all effective, the detecting signal is in a first state, and when the power on signal and the operating voltage ready signal are all ineffective, or the standby voltage ready signal is ineffective, the detecting signal is in a second state; and
   a display unit, coupled to the voltage detection module, for receiving and displaying the detecting signal.

7. The server system as claimed in claim 6, wherein the voltage detection module comprises:
   a first inverter, having an input terminal receiving the power on signal, and an output terminal generating a first voltage signal;
   an OR gate, having a first input terminal receiving the operating voltage ready signal, a second input terminal coupled to the output terminal of the first inverter, and an output terminal generating a second voltage signal; and
   an AND gate, having a first input terminal coupled to the output terminal of the OR gate, a second input terminal receiving the standby voltage ready signal, and an output terminal generating the detecting signal.

8. The server system as claimed in claim 7, wherein the display unit comprises:
   a light emitting diode, having an anode coupled to the output terminal of the AND gate, and a cathode coupled to ground.

9. The server system as claimed in claim 7, wherein the voltage detection module further comprises:
   a second inverter, having an input terminal coupled to the output terminal of the AND gate, and an output terminal generating a third voltage signal.

10. The server system as claimed in claim 9, wherein the display unit comprises:
    a first light emitting diode, having an anode receiving the detecting signal, and a cathode receiving the third voltage signal; and
    a second light emitting diode, having an anode coupled to the cathode of the first light emitting diode, and a cathode coupled to the anode of the first light emitting diode.

11. The server system as claimed in claim 1, wherein the DC transformation units respectively comprise:
    a voltage current capturing unit, connected to a baseboard management controller of the corresponding motherboard through a bus, for receiving the DC voltage to transmit related information of the DC voltage to the baseboard management controller of the corresponding motherboard.

12. The server system as claimed in claim 1, wherein the DC transformation units respectively comprise:
    a switching unit, coupled to the corresponding motherboard, and receiving the standby voltage and the operating voltage, wherein when the corresponding motherboard is in the standby state, the switching unit outputs the standby voltage to the corresponding motherboard, and when the corresponding mother board is in a turned-on state, the switching unit outputs the operating voltage to the corresponding motherboard.

13. The server system as claimed in claim 1, wherein the DC transformation units respectively comprise:
    a DC buck unit, for receiving the operating voltage, and transforming the operating voltage into a system operating voltage required by the corresponding motherboard.

* * * * *